United States Patent [19]
Cross et al.

[11] Patent Number: 4,914,068
[45] Date of Patent: Apr. 3, 1990

[54] PROCESS FOR THE DISPERSION OF GROUP VIII METALS IN LARGE PORE ZEOLITE CATALYSTS

[75] Inventors: Virginia R. Cross; Jar L. Kao, both of Houston; Thomas H. Vanderspurt, Atascocita; Murray Nadler, Houston, all of Tex.; Theodorus M. Wortel, Rotterdam, Netherlands

[73] Assignee: Exxon Chemical Patents Inc., Linden, N.J.

[21] Appl. No.: 170,503

[22] Filed: Mar. 21, 1988

[51] Int. Cl.$^4$ .................. B01J 29/06; B01J 37/22; B01J 23/90
[52] U.S. Cl. .................. 502/74; 502/37; 502/66

[58] Field of Search .................. 502/66, 74, 37

[56] References Cited
U.S. PATENT DOCUMENTS 3,013,990 12/1961 Breck .................. 502/74
3,200,083 8/1965 Milton .................. 502/74
3,226,339 12/1965 Frilette et al. .................. 502/74
3,354,078 11/1967 Miale et al. .................. 502/74

Primary Examiner—Carl F. Dees
Attorney, Agent, or Firm—T. B. Morris; S. H. Markowitz

[57] ABSTRACT

This invention relates to methods for dispersing Group-VIII and other metals containing zeolites, particularly large pore zeolites.

37 Claims, No Drawings

PROCESS FOR THE DISPERSION OF GROUP VIII METALS IN LARGE PORE ZEOLITE CATALYSTS

FIELD OF THE INVENTION

This invention relates to methods of dispersing Group-VIII and other metals on catalysts containing zeolites.

BACKGROUND OF THE INVENTION

Catalysts are widely employed in the petrochemical industry, particularly in reforming operations, for converting normal paraffins and other less desired constituents of a hydrocarbon feedstock to desirable aromatic compounds. The catalysts employed for these purposes typically include a substrate and one or more Group-VIII metals, most typically platinum, dispersed on the substrate, and may also include a binder for the substrate to form industrially useful aggregates.

Reforming catalysts may be prepared by depositing salts of the catalytic metal on the substrate and then calcining the substrate with the deposited salts in an oxidizing atmosphere to convert the metals to oxides and/or complexes including the metals, oxygen and other components, typically halogens such as chlorine. The catalyst in this oxidized condition ordinarily is loaded into a reactor and contacted with hydrogen at an elevated temperature to reduce the metallic oxides or oxide complexes to the free metal or active state. In a typical reforming process, the hydrocarbon feedstock is passed over the catalyst together with hydrogen at an elevated temperature. Under these conditions, some of the paraffins in the feedstock react to form the desired aromatic products. Other important hydrocarbon reactions occurring during reforming include the dehydrogenation of cyclohexanes and dehydroisomerization of alkylcyclopentanes to aromatics, isomerization of normal paraffins to isoparaffins, dealkylation of alkylbenzenes, and hydrocracking. Hydrocracking reactions (which are to be avoided) produce light gaseous hydrocarbons, e.g., methane, ethane, propane and butane. After the catalyst has been so employed for a prolonged period, it typically loses some activity via the twin processes of coking and catalytic metal agglomeration. The catalysts may be regenerated by processes which include exposing the catalyst to oxygen at an elevated temperature to burn off coke deposits accumulated on the catalyst during its exposure to the feedstock. The coke burning operation ordinarily also causes some agglomeration of the catalytic metal into relatively large particles.

This agglomeration may be reversed, and the metal redispersed, by exposing the catalyst at an elevated temperature to a gas comprising oxygen, a source of a halogen and, typically, some water vapor to form oxyhalides or halides of the metal. The term "oxychloride" obviously refers to an oxyhalide in which the halide is chlorine. After redispersion, the catalyst may then be treated with a hydrogen-containing gas to reduce the metal to the free metallic or active state.

The dispersion procedure may be employed before the catalyst is exposed to the feedstock; that is to say, before the catalyst is first reduced, to enhance the dispersion of the metal on the catalyst. As used in this disclosure with reference to catalyst treatment procedures, the terms "activation" and "activating" refer broadly to procedures for bringing the catalyst to an active state, regardless of whether or not the catalyst has previously been employed to treat a feedstock, whereas the terms "regeneration" and "regenerating" refer specifically to procedures employed for bringing previously used catalyst to an active state.

The nature of the substrate and the distribution of the metal on and in that substrate can profoundly affect the performance of the catalyst. Catalysts incorporating a zeolite base, notably a type L zeolite base, may be employed in reforming operations as set forth in U.S. Pat. No. 4,104,320. A "type L zeolite" is a zeolite having a particular crystal structure as set out below. Type L zeolite-based catalysts provide better selectivity to $C_6$-$C_8$ aromatics than do other commonly used commercial reforming catalysts. As disclosed in copending, commonly assigned U.S. patent application No. 550,951, filed Nov. 10, 1983, (now abandoned) the activity and selectivity of a type L zeolite based catalyst are markedly improved by dispersing the catalytic metal throughout the pores or channels of the zeolite. The '951 application discloses various regeneration procedures which are said to result in good dispersion of metal on the zeolite L substrate. Excellent catalysts based on type L zeolites have become increasingly important in reforming operations with the advent of the particular improved type L zeolites with a cylindrical morphology as described in U.S. Pat. No. 4,544,539. These zeolites provide, inter alia, increased catalyst life in conjunction with the other benefits of type L zeolite catalyst substrates.

Although the procedures disclosed in the aforementioned U.S. patent application Ser. No. 550,951 provide good results, further improvement is desirable.

The '951 application does not recognize the benefits attributable to a reduction step practiced at a temperature sufficiently lower than the chlorination or oxychlorination step; the benefits attainable by cooling the catalyst in the presence of oxygen before that reduction.

SUMMARY OF THE INVENTION

The present invention provides dispersion procedures suitable for catalysts containing at least one Group-VIII metal and large pore zeolites.

One significant aspect of the present invention includes the discovery that the performance of a Group-VIII metal-containing catalyst, particularly a catalyst including a Group-VIII metal on a large pore zeolite substrate such as zeolite L, can be materially improved by cooling the catalyst between the dispersion step and the reduction step of an activation or regeneration process while substantially maintaining the dispersion of the Group-VIII metal, and conducting at least the initial portion of the reduction step at a relatively low temperature.

In all preferred processes according to this aspect of the present invention, the metal is dispersed on the catalyst base by exposing the catalyst to a gas containing either oxygen and a halogen-containing compound or a halogen with or without oxygen while maintaining the catalyst at a range of temperatures sufficient to form oxyhalides or halides of the metal. These temperatures typically are above about 475° C. and, more desirably, between 500° and 520° C. The catalyst is then cooled to within a second range of temperatures, typically below about 430° C., preferably below about 375° C., more preferably below about 350° C. At temperatures in this range, the Group-VIII metal is substantially less mobile than at temperatures in the higher temperature range.

Although the present invention is not limited by any theory of operation, it is believed that cooling the catalyst before initiating the reduction step tends to inhibit agglomeration of the Group-VIII metal during the reduction step.

Additionally, after a dispersion step, the catalyst contains some halogen. Upon exposure to a hydrogen containing reducing gas, the halogen in the catalyst may form hydrogen halides. For example, where the dispersion step involves exposure to an oxychlorinating gas, the catalyst contains some chlorine, and the chlorine tends to form hydrogen chloride during reduction. It is believed that exposure of the catalyst to excessively high concentrations of hydrogen halide formed during reduction tends to promote agglomeration of the metal on the catalyst substrate. It is further believed that these phenomena are particularly pronounced during the initial portions of the reduction step, while the catalyst still has substantial amounts of halogen available for conversion to halides. A "spike" or "front" of gas containing a high concentration of hydrogen halide is formed upon the initial introduction of the hydrogen containing gas at the start of the reducing step.

Controlling the rate at which hydrogen is introduced to the catalyst in the reducing step regulates the rate at which hydrogen halides are produced and hence limits the size of any hydrogen halide "spike." Alternatively, after dispersion but before the reduction step, the catalyst may be exposed to a gas containing oxygen and water vapor to expel the halogen found in the catalyst after oxychlorination. Each of these steps can limit the exposure of the catalyst to excessive hydrogen halide during reduction.

It is believed that conducting at least the initial portion of the reduction step at a relatively low temperature tends to minimize the sensitivity of the catalyst to the produced hydrogen halides. Because the catalyst is at a relatively low temperature when exposed to the highest concentration of hydrogen halides, the Group-VIII metal is less mobile and more resistant to agglomeration caused by such exposure. If the metal on the catalyst is well dispersed at the start of the cool reduction step, the dispersion can be maintained in the finished, reduced catalyst.

It has been found that some agglomeration can occur during a cooling step following oxyhalogenation or halogenation. Further aspects of the present invention provide methods of cooling the catalyst before the reduction step.

In the preferred processes according to the present invention, this agglomeration is minimized by substantially preserving the oxyhalides or halides until the catalyst is cooled. This result may be obtained by maintaining an atmosphere containing a minor amount of oxygen over the catalyst during the cooling step, i.e., until the catalyst temperature reaches the immobilizing range discussed above. If the cooling rate in the cooling step is quite high, e.g., greater than 27° C. per hour, oxygen may be omitted from the gas introduced in that cooling step. The gas may also contain one of the halogen sources and/or water as also discussed above. Therefore, the dispersion of metal is maintained even where the cooling step occurs at a very slow rate.

After the catalyst reaches the lower temperature range, it may be treated by exposure to a "soaking" gas including oxygen and water vapor at temperatures in that lower range to remove residual halogens left from the oxyhalogenation or halogenation and cooling stages before the reduction step. Whether or not such a "soaking" step is employed, there must be a transition between oxidizing and reducing atmospheres. A hydrogen-containing reducing gas typically cannot be introduced directly into a reactor which contains an oxidizing gas, as an explosion would occur. Therefore, a gas typically regarded as inert such as nitrogen is employed to purge the oxidizing gas before reduction.

As will be appreciated, the foregoing summaries of individual aspects of the present invention treat the various aspects separately. However, the present invention in its most preferred forms incorporates all of these various aspects, and all of these aspects of the invention coact to provide a final regenerated or activated catalyst with the metal in the reduced state and in an excellent condition for use in catalytic reforming and the like, i.e., with the metal well dispersed in the pores of the zeolite and with the pores substantially free of blocking foreign matter.

These and other objects, features and advantages of the present invention will be more readily apparent from the detailed description of the preferred embodiment set forth below.

THE INVENTION

As noted above, this invention is a process for dispersing at least one Group-VIII metal throughout a large pore zeolite catalyst. These catalysts are particularly suitable for aromatizing $C_6$–$C_8$ paraffins in the presence of hydrogen.

In a reforming or an aromatization operation, feedstock comprising aliphatic hydrocarbons is passed through several reactors which are connected in sequence, together with hydrogen. Conditions such as temperature, pressure and the like are maintained substantially in accordance with the reforming conditions set forth in U.S. Pat. No. 4,104,210, viz, pressures from 0 to 40 bars, preferably from 0 to 25 bars, most preferably between about 5 and about 14 bars of pressure, and temperatures between about 430° C. and about 550° C., more preferably between about 450° C. and 550° C., most preferably between about 480° C. and 524° C. The molar ratio of hydrogen to hydrocarbons is maintained within the range of about 2 to about 20, preferably between about 3 and about 10. The more important hydrocarbon reactions occurring during reforming operation include dehydrogenation of cyclohexanes and dehydroisomerization of alkylcyclopentanes to aromatics, dehydrocyclization of paraffins to aromatics, isomerization of normal paraffins to isoparaffins, dealkylation of alkylbenzenes, and hydrocracking. Hydrocracking reactions which produce light gaseous hydrocarbons, e.g., methane, ethane, propane and butane should be minimized since this decreases the yield of aromatic products. Some hydrogen is produced as a by-product. The most important reaction for chemical processes is "dehydrocyclization."

PREFERRED CATALYSTS

The invention may be practiced with a variety of catalysts comprising a Group-VIII metal selected from the group consisting of nickel, ruthenium, rhodium, iridium, palladium, platinum and combinations thereof on a large-pore zeolite substrate, the zeolite substrate most preferably being retained in a suitable inert binder. Where Group-VIII metals other than platinum are included, oxyhalides or halides of these metals will form and disperse substantially as do the platinum oxyhalides or halides referred to above. As used in this disclosure, the term "large pore zeolite" refers to a zeolite having an apparent pore size greater than about seven Angstroms. The large pore zeolites include type L zeolite, zeolite X, zeolite Y, and faujasite. If desired, combinations of large pore zeolites may be incorporated in the catalysts.

Catalysts based on type L zeolite are preferred in practice of the present invention. The crystal structure and preparation of certain type L zeolites are described in U.S. Pat. No. 3,216,789. Preferably, the type L zeolites employed in the present processes are type L zeolites with cylindrical morphology disclosed in U.S. Pat. No. 4,544,539. Others are described in U.S. Pat. No. 4,552,731. As set forth in greater detail in the '539 patent, the preferred zeolites have a characteristic X-ray diffraction pattern obtained from CuK radiation with the significant d (Angstroms) values set out in Table A:

TABLE A

| |
|---|
| $16.1 \pm 0.4$ |
| $7.52 \pm 0.05$ |
| $6.00 \pm 0.04$ |
| $4.57 \pm 0.04$ |
| $4.35 \pm 0.04$ |
| $3.91 \pm 0.02$ |
| $3.47 \pm 0.02$ |
| $3.28 \pm 0.02$ |
| $3.17 \pm 0.02$ |
| $3.07 \pm 0.02$ |
| $2.91 \pm 0.02$ |
| $2.65 \pm 0.02$ |
| $2.46 \pm 0.02$ |
| $2.42 \pm 0.01$ |
| $2.19 \pm 0.01$ |

The preferred cylindrical zeolites according to the '539 patent are preferably aluminosilicates and will be described hereinafter in terms of aluminosilicates, though other elemental substitutions are possible, for example aluminum may be substituted by gallium, boron, iron and similar trivalent elements, and silicon may be substituted by elements such as germanium or phosphorus. The aluminosilicates preferably have a composition (expressed in terms of molar ratios of the constituent oxides in anhydrous forms) of:

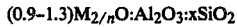

$$(0.9-1.3)M_{2/n}O:Al_2O_3:xSiO_2$$

wherein M is a cation of valence n, x may be from 2.5 to 7.5, preferably from about 5.7 to about 7.4, more preferably from about 5 to about 7 and most preferably from about 6.0 to 6.5. The preferred zeolites have high crystallinity as shown by a well-defined X-ray diffraction pattern (without binder or other diluents present) with sharp peaks.

The exchangeable cation M in the above general formula is preferably potassium, but a portion may be replaced by other cations such as alkali or alkaline earth metals, for example barium, calcium, magnesium, rubidium, or cesium and combinations thereof. The ratio $M_{2/n}O:Al_2O_3$ is preferably from about 0.95 to about 1.15, and generally above 1.

The aluminosilicate form of the zeolite may be hydrated, typically with from 0 to about 9 moles of water per mole of $Al_2O_3$. When used as a catalyst substrate, as described hereinafter, the zeolite may be calcined to remove water. In normal preparation from aqueous gels, a hydrated form is prepared and dehydrated by heating.

Scanning electron micrographs (SEM) of the preferred zeolites show them to have very distinct crystal morphology. Preferred zeolites appear as distinct cylinders in scanning electron micrographs. The use of the term "cylinder" and "cylindrical" is not intended to exclude particles having minor surface irregularities or displaying minor crystallographic faults or dislocations. The cylindrical particle suitable for use in the invention are preferably substantially in the form of circular cylinders and most preferably substantially in the form of right circular cylinders. Particularly preferred cylindrical particles are those having an aspect ratio (the length of the cylinder surface to the diameter of the cylinder) of at least 0.5. Particles having a lower aspect ratio are also described as discs where they have substantially flat basal planes. The aluminosilicate zeolites are preferably characterized by at least about 50%, more preferably about 70% and most preferably about 85%, of the crystallites being cylinders. The aspect ratio of the cylindrical crystallites is preferably from about 0.5 to about 1.5.

The mean diameter of the preferred zeolite cylinders or crystallites is at least about 0.1 micron, preferably at least about 0.5 micron, more preferably from about 0.5 to about 4 microns, and most preferably from about 1.0 to about 3.0 microns. Preferably substantially all the cylindrical particles of zeolite fall within the range of from 0.5 to 4 microns.

The catalyst employed in processes of the present invention may be made by loading one or more Group-VIII metals into the zeolite. Preferably, the zeolite is made into formed particles, e.g., pellets, extrudates, balls, prills, or the like, with an inert binder such as alumina, silica, or clays before loading. References in the present specification to the diameter of the catalyst particles should be understood as referring to the diameter of the formed particles, which preferably is about 1/32" to about ¼". Preferably, the metal is or includes platinum, typically about 0.3 to about 1.5% platinum by weight based on the weight of the zeolite, and is loaded into the zeolite by a process as disclosed in U.S. Pat. No. 4,568,656.

In the loading process of the '656 patent, the zeolite, typically in the pellet or matrix with the binder, is contacted with an aqueous loading solution containing a platinum salt and a non-platinum metal salt, aged to distribute the platinum salt within the pores of the zeolite, dried and then calcined.

The quantity of non-platinum metal salt in the loading solution is carefully controlled by use of the following process. The amount of loading solution to be used (defined as Z) is in excess of that which is required to fill the total pore volume of the zeolite to incipient wetness (defined as X, where Z is always greater than X). The amount of non-platinum metal salt (defined as A) initially present in combination with the platinum source in the loading solution is such that after loading, the initial amount of non-platinum metal salt (A) plus the amount of non-platinum metal salt added to the solution by ion-exchange between the platinum source and the zeolite (defined as $A_1$) is present in the loading solution (Z) in a concentration $(A + A^1/Z)$ equal to the concentration $A^1/X$ of non-platinum metal salt added to the solution by ion-exchange between the platinum source and the zeolite at incipient wetness within a range:

$$\frac{A + A^1}{Z} = \frac{0.3 A^1}{X} \text{ to } \frac{1.2 A^1}{X}.$$

The excess liquid is removed from the zeolite and the solids are subsequently aged for a time and temperature effective to allow the platinum to migrate and uniformly distribute throughout the zeolite. The aged zeolite is then dried and calcined to convert the platinum to platinum oxide.

After drying and calcining, the catalyst preferably is loaded into the reactors and dried by a process as disclosed in U.S. patent application Ser. No. 875,525. This process removes water absorbed by the catalyst during handling and loading into the reactors.

Briefly, the drying method of the '525 patent application involves heating the catalyst, typically from about ambient temperature while contacting the catalyst with a drying gas and limiting the rate of heat input to the catalyst to thereby limit the rate of water evolution from the catalyst. The rate of water evolution preferably is limited to less than about 0.67 parts by weight water per part by weight of catalyst per hour or less based on the net weight of the catalyst, i.e. the weight of the catalyst excluding any inert binders.

In addition, co-catalysts or promoters such as copper, silver, gold, molybdenum, tungsten, rhenium, tin, or mixtures thereof may also be added to the catalyst composition in some known manner.

DISPERSION PROCESS

The described catalyst may then be used in a reforming or aromatization process. During these reactions, the catalyst gradually loses its effectiveness. The two major reasons are considered to be the production of carbonaceous deposits ("coke") and the agglomeration of the catalytic Group-VIII metal. The process steps outlined below provide a method for removing the coke and redispersing the metal in such a form that the catalyst is again effective.

The process steps described below, excepting the then-extraneous coke-burn step, may also be used to distribute the Group-VIII metal throughout the zeolite before it is ever contacted with a feedstock.

COKE BURN STEP

At the beginning of the regeneration procedure, the reactor containing the catalyst may be filled with hydrocarbon feedstock, aromatic products from the dehydrocyclization reaction, and minor amounts of hydrogen and light hydrocarbons. The reactor is under the temperature and pressure conditions employed in the dehydrocyclization procedure. It may be appropriate to purge the catalyst bed with hydrogen or a mixture of hydrogen and light hydrocarbons to remove the feed and product hydrocarbons. After the hydrogen or hydrogen and light hydrocarbon purge, the catalyst bed may then be purged with a dry, substantially inert gas, preferably nitrogen.

During one or both of the hydrogen purge and inert gas purge operations, the catalyst may be cooled to an appropriate initiation temperature for the coke burn cycle to follow. This cooling obviously may be accomplished by regulating the temperature of the hydrogen, recycle gas or nitrogen admitted to the catalyst bed. This initiation temperature preferably is less than about 430° C. [806° F.], more preferably less than about 400° C. [750° F.] and most preferably between about 315° and about 400° C. [600°–750 ° F.].

Once the catalyst bed has been brought to the desired coke burn initiation temperature and freed of combustible gases by the inert gas purge, oxygen, water vapor (optionally) and additional inert gas are introduced into the catalyst bed. Should water vapor be introduced, the relative rates of addition and purge are selected to provide an appreciable concentration of water vapor in the gas circulating through the catalyst bed, typically about 2,000 to 6,000 vppm. The water vapor concentration may be maintained at a substantially constant level throughout the coke burn step. The gas addition and purge rates also provide an initial coke burn oxygen partial pressure such that the reaction between oxygen and the coke on the catalyst proceeds very slowly if at all at the prevailing coke burn initiation temperature. The initial coke burn oxygen concentration is more preferably less than about 0.4 mole percent, or preferably less than about 0.3 mole percent, and most preferably between about 0.2 mole percent and 0.3 mole percent.

While maintaining the oxygen concentration at its initial level, the temperature of the gas entering the catalyst bed and the temperature of the catalyst may be gradually increased until the catalyst reaches a temperature sufficient to initiate combustion of the coke on the catalyst. This combustion is shown by a wave of exothermic reaction, commonly referred to as a "flame front," passing downstream through the catalyst bed. The precise kindling temperature at which the flame front forms will depend, inter alia, upon the oxygen concentration, the nature of the coke deposits, and the geometric configuration of the catalyst, such as its packing density within the catalyst bed. However, kindling typically will occur at temperatures of about 450°–475° C. The initial flame front produced when the reactor reaches the kindling temperature is just barely self-supporting. That is, the rate of heat evolution due to combustion of the coke within the relatively small volume of catalysts involved in the flame front at a given moment just barely exceeds the rate of heat dissipation from the catalyst in the flame front to the surrounding catalyst and gas in the reactor. Thus, the temperature within the flame front rises only slightly above the temperature of its surroundings. It is believed that the relatively moderate flame front temperatures tend to minimize agglomeration of the platinum in the catalyst during the coke burn step.

After the flame front has passed entirely through the catalyst bed, the average catalyst temperature may then be increased slowly to a final coke burn temperature which is preferably at least about 482° C. [900° F.], more preferably between about 482° C. and about 538° C. [900°–1,000° F.], and most preferably between about 510° and 521° C. [906°–970° F.]. The oxygen concentration may be gradually increased to a final coke burn oxygen concentration. The final coke burn oxygen concentration typically is between about 4 mole percent and about 6 mole percent, more preferably between about 4 mole percent and about 5 mole percent, and most preferably is about 4 mole percent. At the most preferred regeneration operating pressures, the gas in the reactor typically contains about 4 to about 6, and preferably about 4 mole percent oxygen.

The catalyst temperature and oxygen partial pressure may be each increased stepwise. With each stepwise increase in oxygen partial pressure or average catalyst temperature, residual coke not consumed during passage of the initial flame through the catalyst burns off in a secondary flame front, forming gaseous byproducts which pass from the system with the purge gas. Preferably, each stepwise increase in oxygen partial pressure or catalyst temperature is initiated after passage of the flame front resulting from the previous increase. The stepwise increases in temperature preferably are taken before any increases in oxygen partial pressure, so that oxygen partial pressure remains at its initial value until the temperature reaches the final coke burn temperature. However, the reverse scheme can be employed as can alternating oxygen pressure and temperature increases. To assure substantially complete combustion of the coke on the catalyst and thereby assure that the pores of the final regenerated catalyst will be substantially free of coke deposits, the catalyst preferably is held at the final coke burn temperature and final coke burn oxygen partial pressure for at least about two hours.

OXYHALOGENATION OR HALOGENATION STEP

After the coke burn step is complete, the circulation through the catalyst bed may be continued. However, this step may be a halogenation or oxyhalogenation step. Depending upon which halogen-containing compound is employed, oxygen may not be necessary. For instance, a molecular halogen, e.g., chlorine, may be added to the inert gas stream to form a compound or complex with the Group-VIII metal in the zeolite. If other halogen-containing compounds are employed, oxygen may be desirable or necessary. The dispersing gas may be selected from a halogen, a hydrogen halide, or an organic compound containing a halogen, or a mixture of these. Oxygen may be added to any of these dispersing gases. The rates of addition for the various compounds may be adjusted to bring the oxygen and water vapor concentrations, if they are desired, in the circulating gas stream to within the desired oxyhalogenation oxygen and water vapor concentration ranges, respectively. The oxyhalogenation oxygen concentration, when used, may be between about 4,300 vppm and about 17,100 vppm, preferably between about 7,700 vppm and about 10,500 vppm, and most preferably between about 8,150 vppm and 9,500 vppm. The water vapor partial pressure is desirably at least about 3,000 vppm, preferably at least about 4,000 vppm to about 8,000 vppm, and most preferably about 6,650 vppm.

The temperature of the gases introduced to the catalyst may be stabilized within a first or "mobilizing" temperature range, preferably encompassing temperatures above about 475° C. [900° F.], more preferably between about 475° C. and about 545° C. and most preferably about 500°–520° C. [932° F.-968° F.]. The preferred temperatures for this mobilizing range are similar to the preferred final coke burn temperatures, so that little if any heating or cooling is required to stabilize the catalyst temperature. After the system reaches steady state with respect to temperature, water vapor and oxygen (if desired), and a source of halogen is then added.

The term "halogen source" as used in this disclosure includes both the halogens per se and other halogen-bearing compounds which dissociate, under the conditions prevailing within the reactor, to yield free halogen. As will be readily appreciated, the halogen source should not include constituents which tend to form deposits on the catalyst, or which poison the catalyst. Thus, the halogen source should be substantially free of known catalyst poisons such as sulfur, phosphorus, selenium, and the like. Preferably, the halogen source is or consists essentially of a source of chlorine, or yields chlorine under the reaction conditions.

Suitable chlorine sources include short-chain chlorinated hydrocarbons such as hexachloroethane and carbon tetrachloride. Particularly preferred chlorine sources are HCl and $Cl_2$; HCl being preferred for ease of handling.

Where the halogen source is or consists essentially of a source of chlorine and is used with oxygen, the oxyhalogenation step is commonly referred to as oxychlorination. The term "oxychlorination" is used hereinbelow for the sake of simplicity. However, the disclosure should be understood as referring to processes using other halogens as well. Equilibrium between free chlorine and HCl in the circulating gases is established by the Deacon reaction:

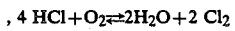

$$4 HCl + O_2 \rightleftharpoons 2H_2O + 2 Cl_2$$

The Deacon reaction proceeds rapidly under the conditions prevailing in the oxychlorination step. Under oxychlorination conditions, the molar ratio of HCl to $Cl_2$ is approximately 18:1, i.e., about 10% of the chlorine atoms present are present as $Cl_2$ rather than as HCl. In the oxychlorination procedure, the amount of chlorine source included in the circulating gas mixture should be sufficient to provide at equilibrium, a $Cl_2$ concentration of at least about 50 ppmv, and preferably between about 50 and 80 ppmv.

As the oxychlorinating gas mixture passes downstream through the catalyst bed, the chlorine and oxygen in the gas mixture react with the Group-VIII metal or platinum species on the catalyst to form chlorides or oxychlorides. The exact composition of the species are not precisely known and may involve a single compound or several interrelated compounds or complexes. The reaction removes $Cl_2$ from the gas mixture as it moves downstream. At the beginning of the process, there is appreciable HCl and chlorine consumption as the gas passes downstream through the catalyst bed, so that the gas mixture becomes substantially depleted of chlorine and HCl as it passes the upstream region of the bed.

Since the gas reaching the downstream portion of the catalyst during this portion of the step does not include an appreciable quantity of HCl or $Cl_2$, the downstream regions are not treated in the earliest portion of the process. They are, instead, exposed to a gas containing nitrogen and possibly oxygen and water vapor. As this step continues, the "front," or point within the catalyst bed where the gas becomes substantially depleted of $Cl_2$ and HCl, moves until it reaches the downstream end of the catalyst bed. At this time, the platinum and the support in most of the catalyst bed has substantially reacted with the gas. The chlorine and HCl content of the gas passing out of the catalyst bed shows a sudden increase. At this point "breakthrough" is said to have occurred.

Ordinarily, there is an appreciable time lag between the initial introduction of the halogen source and the halogen breakthrough; in typical industrial scale reactor, this time lag may be on the order of two hours or more. After breakthrough, the halogen control and the gases passing into the catalyst bed are adjusted to maintain an essentially steady state halogen concentration across the catalyst bed. In a recycle system, this may involve terminating halogen addition.

The platinum oxychlorides or chlorides formed during this step are believed to be mobile at the "mobilizing" temperatures used in this step, and hence are redistributed within the zeolite.

It is believed that substantially all of the platinum on a given portion of catalyst is converted to the platinum chloride or oxychloride rapidly upon contact of that portion of the catalyst with the noted gas mixture. Accordingly most of the platinum in the entire catalyst bed is in the form of platinum chlorides or oxychlorides very shortly after breakthrough occurs. However, the mobilization and spreading of the platinum chlorides or oxychlorides over the zeolite can require appreciable time. It is believed that continued exposure of the catalyst to a gas containing halogen even after substantially all of the platinum in the catalyst has been converted to platinum chlorides or oxychloride serves to maintain the platinum in the form of chlorides or oxychlorides during the time required for the spreading to occur. Regardless of the actual mechanism of operation, it has been observed that markedly superior results are achieved where the catalyst is maintained under those conditions, and within the mobilization temperature range for one to ten hours after breakthrough. Thus, even the most downstream portion of the catalyst bed should preferably be exposed to oxychlorination conditions for at least about an hour, e.g., after breakthrough of the halogen.

The gas mixture also reacts with the exchangeable potassium (or other alkali or alkali earth material) cation in the zeolite structure to form a chloride and so-called "acid sites" within the pores of the zeolite. Acid sites occur where the exchangeable metal cation is replaced by a hydrogen cation. These phenomena are undesirable, inasmuch as acid sites present in the final catalyst tend to crack rather than aromatize the paraffin feedstock. This obviously decreases the selectivity of the catalyst to aromatize. Potassium chloride salts, if present in substantially amounts, can block the pores of the zeolite thereby isolating the platinum in those pores from the feedstock. It is believed that the presence of water vapor in the gas mixture tends to inhibit formation of potassium chloride and the associated acid sites during this step.

COOLING STEP

At the end of the chlorination or oxychlorination step, the temperature of the gases passing to the catalyst bed may be lowered. This, in turn, lowers the temperature of the catalyst bed itself. During the cooling operation, the components in the gas flow through the catalyst bed may be maintained as employed during the steady state portion of the chlorination or oxychlorination step.

The cooling rate employed during this cooldown phase of the process may be as great as possible, e.g., desirably at least about 10° C./hr., preferably at least about 27° C./hr. and most preferably at least about 33° C./hr., with still greater cooling rates being even more preferred. These rates are, of course, highly dependent upon equipment configuration and operations.

The cooling process is continued until the temperature of the catalyst reaches a temperature within a second or immobilizing range of temperatures. In this range of immobilizing temperatures, lower than the mobilizing temperatures used for the oxychlorination or chlorination step, the mobility of various Group-VIII metal species or platinum species on the zeolite substrate is substantially less than in the mobilizing temperature range. The immobilizing temperatures should be less than about 430° C., preferably less than about 375°0 C. and most preferably less than about 350° C., with particularly good results being achieved with cooling to about 343° C.

The continued exposure of the catalyst to chlorinating or oxychlorinating gases during cooling substantially preserves catalytic metal chlorides and oxychlorides on the catalyst. The cooling phase in this preferred embodiment can thus be considered as a continuation of the earlier chlorination or oxychlorination step. However, as the temperature declines, the platinum oxychlorides become substantially "frozen" in position on the catalyst. Prolonged, slow cooling at less than the preferred rates does not impair the dispersion. However, prolonged, slow cooling under chlorination or oxychlorination gases may result in unnecessary formation of other chlorinates, e.g., potassium chloride salts, and acidic sites within the zeolite.

With the preferred cooling rates according to the present invention, the catalyst can be cooled from the mobilizing temperature range to the immobilizing temperature range in less than about ten hours, more preferably less than about six hours, and most preferably less than about five hours after the start of the cooling stage.

One of the purposes of the cooldown step is to maintain the Group-VIII metal in the highly dispersed state, accomplished in the chlorination or oxychlorination step, before reducing the metal at low temperature. Thus far, only a cooldown in an oxychlorinating or chlorinating gaseous stream has been disclosed, however, other gaseous environments can also serve the same end. Two other gaseous streams suitable during the cooldown step would include wet dilute oxygen and dry dilute oxygen.

In a wet dilute oxygen cooldown, the halogen source injection is discontinued after the chlorination or oxychlorination step. The water and oxygen partial pressures may be maintained at the same level as in the oxyhalogenation or halogenation step, but some additional nitrogen is introduced to maintain those partial pressures. Although HCl is not injected as in the oxychlorination cooldown, some HCl is still present in the gas stream due to chloride exchanging off the catalyst support and the platinum chloride and oxychloride complexes. In a one-through reactor, but more so in a recycle reactor system, some HCl would be present for the entire cooldown procedure. Thus the wet dilute oxygen cooldown is essentially quite similar to the oxychlorination cooldown except that no HCl is added, but HCl is still present due to exchange from the catalyst support and platinum complexes.

In a dry dilute oxygen cooldown, both the HCl and the water injection are discontinued after the oxychlorination step. The oxygen partial pressure is left the same as in the oxychlorination step, but some additional nitrogen is introduced to replace the terminated flow. Although HCl and water are not injected as is done in the oxychlorination cooldown, some HCl would still be present in the gas stream due to chloride exchanging off the catalyst support and the platinum chloride and oxychloride complexes, and water would also still be present in the gas stream due to catalyst dehydration.

WET AIR TREATMENT STEP

If a chlorination or oxychlorination cooldown step is used at the end of the cooldown step, exposure of the catalyst to oxychlorinating gas is stopped by terminating addition of the halogen source. The addition of oxygen and water vapor may then be continued in substantially the same way as during the oxychlorination and cooldown steps, although some additional nitrogen may be introduced to replace the terminated flow of halogen-containing gas. If a wet dilute oxygen cooldown step were used, the wet dilute oxygen gas is continued. If dry dilute oxygen were used during the cooldown step, moisture may be introduced to the dilute oxygen. This wet air or oxygen exposure step is intended to remove at least some, if any, potassium chloride which may have been formed during the earlier steps of the process by contact with the oxychlorinating gases. It is believed that this removal proceeds via formation of HCl from the KCl within the catalyst through reaction with the circulating water vapor. During this oxygen and water vapor exposure step, the oxygen and water vapor concentrations within the circulating gas are maintained at substantially the values specified in the discussion of these steps. The oxygen and water vapor exposure step is continued preferably for at least about one hour and more preferably for at least about three hours, until the HCl concentration in the effluent stream leaving the catalyst bed reaches a steady level of less than about 300 vppm, and desirably still lower.

The temperature of the catalyst during the vapor-/oxygen exposure step should be maintained in this "immobilizing temperature range" to keep the platinum on the catalyst substantially immobilized.

DRYING STEP

After the oxygen/water vapor exposure step, the addition of water vapor is terminated, but the oxygen and nitrogen flows are continued substantially as in the preceding steps. However, significant amounts of water vapor typically are found in the effluent gases exiting the catalyst bed for several hours after termination of the water vapor exposure step and termination of water vapor addition. This effluent water vapor represents water absorbed on the zeolite. Zeolites typically are hydroscopic and tend to retain progressively more moisture at progressively lower temperatures. Thus, although it is most desirable and important to maintain the catalyst temperature within the "immobilizing" temperature range, the catalyst temperature also should not be allowed to fall below about 300° C., and preferably not below about 330° C., during drying. The drying operation desirably may be continued until the water vapor concentration in the effluent gas leaving the catalyst bed decreases less than about 155 ppm.

The effluent water vapor partial pressure substantially represents the partial pressure of water vapor in a gas phase at equilibrium with the catalyst and hence correlates directly to the water content of the catalyst. The desired final moisture content of the catalyst can be specified in terms of temperature and water vapor concentration of the circulating gas at equilibrium with the catalyst, viz, preferably less than about 170 and more preferably less than about 110 ppmv at 343° C.

PURGE STEP

It should be apparent that prior to the reduction step, oxygen and any other oxidizing gas components should be purged from the system to prevent the presence of an explosive mixture when hydrogen is added to the system for reduction. This step does not constitute a necessary portion of the invention but would be practiced by a prudent process operator. During a purge step, the catalyst temperature should be maintained in the immobilizing temperature range used for the preceding steps. One desirable method of practicing this step is to purge the system as rapidly as is possible while maintaining pressure within a desired operating range. During the purge step, the catalyst should be substantially dry; that is to say that moisture content should be equal to or below those typically achieved at the end of the drying step.

REDUCTION STEP

At the end of the purge step, the catalyst bed contains substantial amounts of chlorine in the form of platinum chlorides or oxychlorides. Desirably, the catalyst is enveloped in an atmosphere of dry nitrogen at a temperature in the immobilizing range of temperatures mentioned above. Thus, the catalyst may be at a temperature of less than 430° C., preferably less than 375° C. and most preferably 343° to 350° C. The reduction step may be commenced by introducing hydrogen into the inert gas passing into the catalyst bed. The hydrogen reacts with the platinum chlorides and oxychlorides and other unreduced or partially reduced platinum species present on the catalyst and reduces them to the free metallic platinum state. Water and hydrogen chloride are produced as by-products of the reduction.

The hydrogen may be gradually introduced into the system to minimize the hydrogen chloride content of the gases in contact with the catalyst during reduction. For instance, hydrogen is introduced at an extremely low level, such as less than about 0.05% of the total flow rate of nitrogen to the catalyst bed. Samples of the effluent gas stream leaving the catalyst bed may be monitored for hydrogen chloride level. The initial rate of hydrogen addition may be controlled in response to the monitored hydrogen chloride levels to maintain the hydrogen chloride concentration in the catalyst bed effluent below about 1200 vppm and desirably below about 800 vppm. If the hydrogen is added in a step-wise fashion, the HCl content of the final effluent should be less than 150 ppmv, and preferably less than about 75 ppmv.

The temperature of the catalyst bed during the reduction step is also maintained within the "immobilization" range as defined above.

Once the catalyst is reduced, it may be desirable to perform a high temperature reduction step in the presence of water vapor. Water vapor may be added at the partial pressures specified in the discussion of the halogenation or oxyhalogenation step discussed above. The temperature desirably may be between 475° C. [900° F.] and 545° C. [1013° F.] and preferably between about 475° and 520° C. [887° F.–968° F.] and even more preferably between 475° and 500° C. [887° F.–932° F.]. The reducing gas preferably is $H_2$ at the concentration used in the earlier reduction step. Although not wishing to be bound by theory, this step may assist the potassium ions into the ion exchange positions in the zeolite. The catalyst is then ready for use in the aromatization reaction.

ACTIVATION

The procedures described above for regeneration may be applied directly in activation of previously unused catalyst. Ordinarily, the coke burn step is omitted in as much as the same is unnecessary in the absence of coke deposits on the catalyst. The fresh, unused catalyst has typically the catalytically active platinum well dispersed in the pores of the zeolite. Some chlorine may be present as a residue from the platinum chloride complex salts utilized in loading the zeolite with the platinum as described above. If the platinum in the fresh catalyst is already well dispersed, the reduction step of the present activation procedures can be used without the chlorination or oxychlorination and intermediate steps described above. To improve the dispersion of the platinum in the fresh catalyst, however, the chlorination or oxychlorination and intermediate steps may also be employed.

EVALUATION AND EXAMPLES

One way in which the success of the inventive processes may be measured is by direct physical measurements of the metal dispersion in the catalysts, e.g., by high resolution electron microscopy. The performance of the catalyst in dehydrocyclization and like processes also provides an indirect method of evaluating the metal dispersion. Actual performance also provides a measure of other aspects of the process, such as freedom from pore-blocking due to, e.g., the presence of excess chloride salts and the like. The performance of the catalyst may be evaluated by determining the activity and selectivity of the catalyst with a standardized feedstock. As used herein, the term "activity" refers to the percentage of a standard feedstock, e.g., hexane, converted to a different product upon contact with the catalyst under standard conditions. The term "selectivity for aromatics" refers to the proportion of the converted feedstock converted to the aromatic products, rather than to undesired by-products. Typically, both activity and selectivity for aromatics vary directly with dispersion of the metal in the catalyst and vary inversely with pore blockage.

These examples are intended to show various aspects of the disclosure process and are not intended to limit the breadth of the disclosure or the invention in any way.

EXAMPLE 1

The following laboratory procedures were conducted to evaluate the effect of reduction temperature and HCl exposure during reduction on a catalyst. Since HCl is not added during the reduction step disclosed above, this Example provides an indication of the range of acceptable temperatures for a low temperature evaluation.

A batch of coke-contaminated catalyst comprising a platinum loaded zeolite L with exchangeable potassium cations bound with alumina was subjected to the following process steps, all conducted at atmospheric pressure:

TABLE 1

| Operation | Gas Composition (Remainder $N_2$ in All Cases) | Temperature °C. | Time |
|---|---|---|---|
| Coke Burn | 10% $O_2$ + 2.6% $H_2O$ | 510° | 2 hrs. |
| Oxychlorination | 10% $O_2$ + 2.6% $H_2O$ + 0.3% HCl | 510° | 1.5 hr. after $Cl_2$ breakthrough |
| Oxygen Exposure | 10% $O_2$ + 2.6% $H_2O$ | 510° | 1 hr. |

TABLE 1-continued

| Operation | Gas Composition (Remainder $N_2$ in All Cases) | Temperature °C. | Time |
|---|---|---|---|
| Purge | 2.6% $H_2O$ | 510° | 20 min. |

These procedures, conducted on a laboratory scale, provided samples of unreduced catalysts with reasonable platinum dispersion which were then subjected to reduction at a variety of temperatures using various concentration of hydrogen chloride gas added to the reducing gas mixture. In each case, a nine gram charge of catalyst was exposed to a total reducing gas flow rate of 1500 cc/min. The nine gram charge was considered to be so small that HCl evolved in the reduction itself had little or no effect on the downstream portions of the catalyst. However, the HCl added to the reducing gas simulated HCl evolved from more upstream portions of a catalyst bed in an industrial scale operation. Thus, the experiment simulated conditions prevailing at the downstream end of a catalyst bed in an industrial scale process during reduction.

In each case, the reducing gas contained 20% $H_2$, 2.6% $H_2O$, HCl (as indicated) and the remainder nitrogen. The resulting reduced catalysts were evaluated using a catalyst activity test or "CAT" scheme in which the catalyst in a standard laboratory rector was exposed to an n-hexane feedstock along with $H_2$ in a $H_2$:hexane molar ratio of 4.25 and a space velocity [WHSV] of 8. The feedstock was contacted with the catalyst at a temperature of 510° C. and at a pressure of 839 KPa. The results are in Table 2 below. Activity is given in Table 2 as benzene yield based on the total product passing from the reactor. Selectivity is benzene as a percentage of the product which reacted.

TABLE 2

| Reduction Temperature °C. | HCl Content in Reducing Gas % | Activity % (at 50 hrs.) | Selectivity % (at 50 hrs.) |
|---|---|---|---|
| 510 | 0 | 31.5 | 71.5 |
| 425 | 0 | 37.0 | 72.2 |
| 510 | 0.4 | 12.0 | 61.6 |
| 425 | 0.4 | 35.5 | 73.6 |
| 510 | 0.8 | 1.9 | 30.6 |
| 425 | 0.8 | 9.9 | 55.5 |
| 345 | 0.8 | 31.0 | 70.6 |

For each set of pairs having a common HCl content, activity and selectivity increase as the reduction temperature decreases. These results plainly indicate that the effects of hydrogen chloride in a reducing gas stream are mitigated or eliminated by use or lower reduction temperatures.

We claim as our invention:

1. A method for dispersing at least one Group-VIII metal in a catalyst containing a large pore zeolite and at least one Group-VIII metal comprising the steps of:
   (a) dispersing the at least one Group-VIII metal on the zeolite by exposing the catalyst to a gaseous stream containing at least one halogen source elected from a halogen, a halogen and oxygen, a hydrogen halide and oxygen, oxygen and an organic compound containing halogen, and mixture of these at a temperature sufficient to form oxyhalides or halides of said metal;
   (b) cooling the catalyst to a temperature less than the dispersing temperature of step (a) and then (c) reducing said Group-VIII metal by contacting the catalyst with a reducing as at least initially within the temperature range of step (b).

2. The method of claim 1 wherein water vapor is present in at least one of the dispersing, cooling and reducing steps.

3. The method of claim 2 wherein water vapor is present during the cooling step.

4. The method of claim 2 wherein oxygen is present in the cooling step.

5. The method of claim 1 wherein the gaseous stream present during the cooling step contains the same components as that present in the dispersing step.

6. The method of claim 1 wherein the dispersing step is at a temperature above about 475° C., the cooling step terminates at a temperature less than about 430° C., and the reducing step is conducted at a temperature less than about 430° C.

7. The method of claim 1 wherein the dispersing step is terminated between one and ten hours after a halide or hydrogen halide is detected at the outlet of a bed containing said catalyst.

8. The method of claim 1 wherein the cooling step is conducted in the presence of a gas stream also comprising at least one halogen source selected from a halogen, a hydrogen halide, and an organic compound containing a halogen.

9. The method of claim 8 wherein oxygen is present in the cooling step.

10. The method of claim 6 wherein said gas in the dispersing step includes water vapor and gas present in the cooling step comprises oxygen, water vapor and a halogen source.

11. The method of claim 10 wherein the halogen sources comprise chlorine.

12. The method of claim 1 wherein the large pore zeolite is a zeolite L.

13. The method of claim 12 wherein the zeolite L is of a generally cylindrical crystal shape.

14. The method of claim 11 wherein the zeolite L contains cation from potassium, barium, cesium, rubidium, calcium, magnesium and mixtures thereof.

15. The method of claim 14 wherein the catalyst is formed.

16. The method of claim 12 wherein the cation is potassium.

17. The method of claim 6 wherein the reduction step terminates at a temperature less than about 350° C.

18. The method of claim 6 wherein the cooling step terminates at a temperature less than about 350° C.

19. The method of claim 1 wherein the catalyst contains coke, further comprising the step of burning said coke by exposing the catalyst in said bed to an oxygen-containing gas at a temperature and oxygen concentration sufficient to cause combustion of the coke.

20. The method of claim 19 wherein the oxygen containing gas in said burning step contains water vapor sufficient to provide a concentration of at least about 3000 vppm.

21. The method of claim 1 wherein the concentration of hydrogen in said reducing gas is controlled to limit the concentration of hydrogen halides leaving the catalyst in less than about 1200 ppmv.

22. The method of claim 1 additionally comprising the step of contacting the catalyst with a soaking gas containing oxygen and water after the cooling step and prior to the reducing step.

23. The method of claim 1 wherein said catalyst is cooled, in said cooling step, at an average rate of at least about 27° C./hr.

24. The method of claim 6 also comprising the additional reducing step of contacting the catalyst with gas containing hydrogen and water vapor at a temperature in the range of 475° C. and 545° C.

25. The method of claim 24 wherein the additional reducing step is carried out between 475° C. and 520° C.

26. The method of claim 25 wherein the additional reducing step is carried out between 475° C. and 500° C.

27. The method of claim 1 wherein said Group-VIII metal is selected from the group, consisting of nickel, ruthenium, rhodium, iridium, palladium, platinum and combinations thereof.

28. The method of claim 27 wherein the catalyst also contains a metal selected from copper, silver, gold, molybdenum, tungsten, rhenium, tin, nickel, ruthenium, palladium, or mixtures thereof.

29. The method of claim 2 wherein said zeolite L is a zeolite having an x-ray deflection pattern obtained from $CuK\alpha$ radiation with significant d values set out in Table A and comprising highly crystalline crystallites having at least 50% of its crystallites in the form of distinct circular cylinders with an aspect ratio of at least 0.5 and with a mean diameter of at least 0.5 micron.

30. The method of reducing a catalyst comprising a large-pore zeolite and at least one Group-VIII metal, the catalyst initially containing one or more halogens, the method comprising the steps of reducing the catalyst by contacting it with a hydrogen-containing reducing gas at a reducing temperature sufficient to cause reduction of said metal by the hydrogen in said gas, whereby hydrogen halides are formed in said reducing gas, and limiting the concentration of hydrogen in said reducing gas so as to limit the concentration of hydrogen halides in said reducing gas to less than about 1200 vppm.

31. The method of claim 30 wherein said Group-VIII metal is initially present on said catalyst at least in part in the form of halides or oxyhalides of said metal dispersed in the pores of said zeolite.

32. The method of claim 30 wherein said limiting step includes the step of monitoring the concentration of hydrogen halides in said reducing gas and controlling the concentration of hydrogen in said reducing gas in response thereto.

33. The method of claim 32 wherein said monitoring step includes the step of detecting a first momentary increase in the exhaust gas hydrogen halide concentration and said controlling step includes the step of initially increasing the hydrogen concentration in the inlet gas after termination of said first momentary increase in hydrogen halide concentration.

34. The method of claim 33 wherein said catalyst is maintained at less than about 430° C. during said reducing step until at least after termination of said first momentary increase in hydrogen halide concentration.

35. The method of claim 34 wherein the hydrogen concentration in the reducing gas supplied to said bed is controlled so as to limit the hydrogen halide concentration in the reducing gas discharged from the bed to less than about 1,200 ppmv at least until termination of said momentary increase.

36. The method of claim 35 wherein said catalyst is maintained at less than about 430° C. during said reducing step at least until after termination of said first momentary increase in hydrogen halide concentration.

37. The method of claim 30 wherein said zeolite is a zeolite L and said Group-VIII metal is selected from the group consisting of nickel, ruthenium, rhodium, iridium, palladium, platinum and combinations thereof, and at least part of said metal is present on said zeolite as oxychlorides and chlorides dispersed in the pores of said zeolite.

* * * * *

UNITED STATES PATENT AND TRADEMARK OFFICE
CERTIFICATE OF CORRECTION

PATENT NO. : 4,914,068

DATED : April 3, 1990

INVENTOR(S) : Cross, et al.

It is certified that error appears in the above-identified patent and that said Letters Patent is hereby corrected as shown below:

In the section entitled Inventors, please insert after Netherlands -- Shun C. Fung, Bridgewater, N.J. --.

Signed and Sealed this

Eighth Day of September, 1992

Attest:

DOUGLAS B. COMER

Attesting Officer

Acting Commissioner of Patents and Trademarks